UNITED STATES PATENT OFFICE.

CARLETON ELLIS, OF WHITE PLAINS, NEW YORK, ASSIGNOR TO ELLIS-CHALMERS COMPANY, A CORPORATION OF WEST VIRGINIA.

VARNISH COMPOSITION.

No. 900,687.  Specification of Letters Patent.  Patented Oct. 6, 1908.

Application filed May 22, 1907. Serial No. 375,016.

*To all whom it may concern:*

Be it known that I, CARLETON ELLIS, a citizen of the United States, and resident of White Plains, in the county of Westchester and State of New York, have invented certain new and useful Improvements in Varnish Compositions, of which the following is a specification.

This invention relates to compositions to be used as varnishes which comprise resins extracted from certain rubber products which I shall hereafter denote by the name "rubber resin".

A number of the crude rubber stocks or materials used at the present day in the manufacture of rubber goods contain in their raw state from 30 to 75% of resin, sometimes even more than that amount; and as this resin seldom imparts to the gum qualities which are desirable, it is largely removed by suitable extraction as with acetone or methyl acetate or in other ways, affording a by-product of a substantially resinous character which has heretofore found but little use. While similar in appearance to ordinary colophonium, it is usually widely different chemically and because of this, unfit for the many uses for which colophonium is adapted; for instance, the resin obtained from gum pontianac is ordinarily unsaponifiable, and, therefore cannot be used to advantage in the manufacture of soaps, nor can it be advantageously employed in many varnishes because of its inability to combine freely and effectively with lime or other bases to form a materially hardened product similar to "hardened rosin".

The object of my invention is to make use of such resins, now mostly waste products, in the manufacture of useful varnish compositions. This I accomplish by combining the resin with Chinese wood oil or tung oil or chemically similar drying oil, and by such combination I produce a useful composition which dries with a hard glossy finish, one which is exceedingly impervious to moisture and especially hard and durable. With this composition I also may employ other raw materials of the varnish industry including other resins in small quantity to secure certain finish effects; and may, of course, incorporate with or employ in these compositions a suitable quantity of a thinning material such as spirits of turpentine and petroleum hydrocarbon as benzin or hydrocarbons from coal-tar and shale oil as benzole and its homologues and the like, to secure the requisite consistency or modify the "body".

Driers may be used if desired and for this purpose I prefer to incorporate with the wood oil prior to its admixture with the rubber resin, a quantity of manganese or lead borate, resinate, etc. It is desirable, however, to keep down to a minimum the amount of drier used, and I prefer to have present in the finished product less than one-tenth of 1% of these metallic oxids which produce drying effects and in many instances I omit the drying agent entirely as the rubber resin and the wood oil furnish a rapidly drying varnish *per se*.

Linseed oil, *per se*, is not adapted for use with said rubber resin, but may be added to some extent to compositions made in accordance with my invention and the resulting varnishes are useful in certain cases where a slow drying product is a desideratum. A satisfactory varnish stock in accordance with my invention is made by melting 100 lbs. of gum pontianac and adding thereto 125 lbs. of Chinese wood oil preferably the raw oil. When incorporation is completed, by heating and stirring for a short time, the mass is thinned with 200 lbs. of spirits of turpentine. Another illustrative varnish-stock formula consists of 100 lbs. of gum pontianac, 100 lbs. boiled Chinese wood oil, 10 gallons of turpentine and 5 gallons of benzin.

Another varnish-stock formula illustrative of my invention is as follows: 100 lbs. Chinese wood oil are heated with 5 lbs. manganese resinate, in a separate kettle 140 lbs. of pontianac resin are melted and heated and the two masses incorporated. When thoroughly mixed and somewhat cooled, 10 gallons of benzin are run in and the varnish settled or filtered to produce a clear product.

Among the gums which supply the resin suitable for such compositions are Gaboon lump, Lapori seconds which contain sometimes 85 to 90% of resinous components. Niger paste which is also highly charged with resinous matter, pontianac, already mentioned, Tuno gum and the like.

It should be understood that the material which I employ is not the raw gum containing both rubber constituents and the resin, but it is the substantially resinous product resulting from the extraction of said raw gum, which resinous product, is free from or largely free from rubber bodies.

What I claim is:—

1. A varnish composition comprising rubber resin and Chinese wood oil.
2. A varnish composition comprising rubber resin, wood oil and a thinner.
3. A varnish composition comprising rubber resin, wood oil, a thinner, and a drier.
4. A varnish composition comprising pontianac resin and wood oil.
5. A varnish composition comprising pontianac resin, other resinous materials and wood oil.
6. A varnish composition comprising pontianac resin, wood oil and a thinner.
7. A varnish composition comprising pontianac resin, wood oil, a thinner, and a drier.
8. A varnish composition comprising about equal parts pontianac resin and wood oil.
9. A varnish composition comprising about equal parts pontianac resin and wood oil with which is incorporated a suitable quantity of a thinning agent.

Signed at New York in the county of New York and State of New York this 20th day of April A. D. 1907.

CARLETON ELLIS.

Witnesses:
FLETCHER P. SCOFIELD,
HARRY B. CHALMERS.